(No Model.)
J. LANGELAAN.
END ELECTRODE FOR ELECTRIC POWER STORAGE BATTERIES.
No. 570,028.  Patented Oct. 27, 1896.
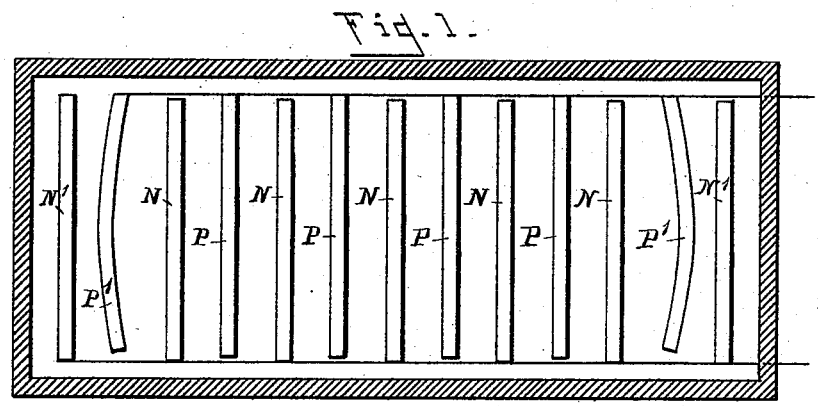
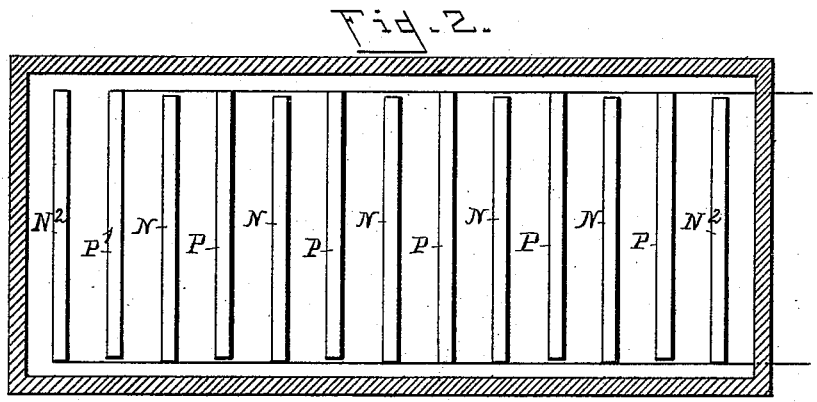
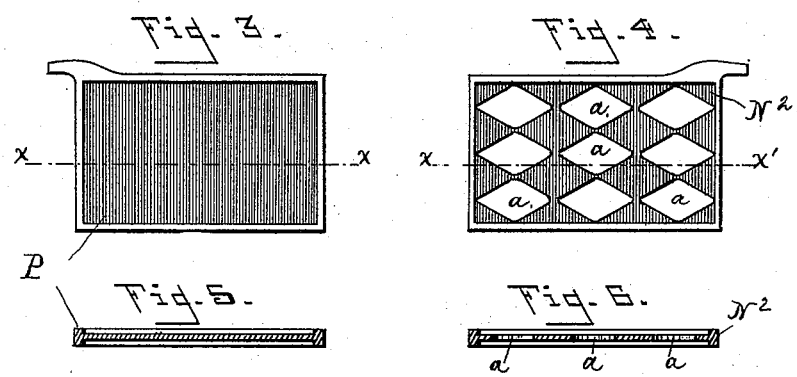
WITNESSES
H. N. Jenkins
Jae. A. Richmond.
INVENTOR
Jacobus Langelaan
by G. Dittmar,
Attorney

UNITED STATES PATENT OFFICE.

JACOBUS LANGELAAN, OF COLOGNE, GERMANY.

END ELECTRODE FOR ELECTRIC-POWER STORAGE BATTERIES.

SPECIFICATION forming part of Letters Patent No. 570,028, dated October 27, 1896.

Application filed December 10, 1895. Serial No. 571,626. (No model.) Patented in Germany July 5, 1895, No. 9,708, and in England October 28, 1895, No. 20,306.

*To all whom it may concern:*

Be it known that I, JACOBUS LANGELAAN, a subject of the King of the Netherlands, residing at No. 10 Kameckestrasse, Cologne, Germany, have invented a new and useful End Electrode for Electric-Power Storage Batteries or Accumulators, (for which I have obtained patents in Germany, No. 9,708, dated July 5, 1895, and in England, No. 20,306, dated October 28, 1895,) of which the following is a specification.

My invention relates to those plates or electrodes of electric accumulators which form the ends of a battery. Generally these batteries are arranged so that each positive plate is placed between two negative plates, so that each side face of the positive plates is regularly exposed to the influence of one side face or half a plate of the negative polarity. Only the last plates of the positive series are exposed to the influence of the capacity of the whole of a negative plate, that is, of both of its side faces. These last positive plates have the drawback that their outer side is too much strained by the active mass of the outer side expanding more than the inner side, and buckling or bulging ensues, which gives the plate a curvature and the active mass cracks and parts of it fall out, reducing the durability of the storage battery. My new end plate for accumulators remedies this defect.

On the accompanying drawings, Figure 1 is a plan of an ordinary battery after use. Fig. 2 is a similar view of a battery as when provided with my improved end electrodes. Fig. 3 is a face view of an inner plate, and Fig. 4 a similar view of one of my end electrodes. Fig. 5 is a horizontal section through the line $x\,x$ of Fig. 3, and Fig. 6 a horizontal section through the line $x'\,x'$ of Fig. 4.

This new end plate is to take the place of N' N' in the battery shown by Fig. 1, representing an ordinary electric storage battery with the positive series of plates P P always between the negative plates N N, the last positive plates P' P' being shown curved or bulged. Now this bulging is prevented when in place of N' N' my new improved end plate is put. Figs. 4 and 6 of the drawings show the same ($N^2$) to be of such design that it has only half the capacity and surface of the other plates of the same battery by having holes $a$ cut out of it, so that the surface and the active mass thereby are reduced to about half of that of the other plates of same size in the battery.

In Fig. 4 diamond-shaped holes are shown. The form of the holes of course is immaterial and they may be of other form as long as the remaining area and capacity of the plates by cutting such holes in them is reduced to half that, or nearly so, of the other plates.

I am aware that perforated plates have been used for storage batteries, and I do not claim, broadly, the use of such plates as my invention; but What I do claim is—

The combination in electric storage batteries, having positive and negative plates provided with active material, alternately arranged therein, of end plates having openings therein, as described, and the plates intermediate the end section having unbroken surfaces, substantially as and for the purpose set forth.

JACOBUS LANGELAAN.

Witnesses:
 MARIA NAGEL,
 WILLIAM H. MADDEN.